US 8,072,456 B2

(12) United States Patent
Mech

(10) Patent No.: US 8,072,456 B2
(45) Date of Patent: Dec. 6, 2011

(54) SYSTEM AND METHOD FOR IMAGE-BASED RENDERING WITH OBJECT PROXIES

(75) Inventor: Radomir Mech, Mountain View, CA (US)

(73) Assignee: Graphics Properties Holdings, Inc., New Rochelle, NY (US)

( * ) Notice: Subject to any disclaimer, the term of this patent is extended or adjusted under 35 U.S.C. 154(b) by 0 days.

(21) Appl. No.: 13/010,566

(22) Filed: Jan. 20, 2011

(65) Prior Publication Data

US 2011/0175924 A1 Jul. 21, 2011

Related U.S. Application Data

(62) Division of application No. 12/050,104, filed on Mar. 17, 2008, now Pat. No. 7,903,121, which is a division of application No. 10/197,845, filed on Jul. 19, 2002, now Pat. No. 7,362,335.

(51) Int. Cl.
G06T 17/00 (2006.01)
G09G 5/00 (2006.01)
(52) U.S. Cl. ........ 345/428; 345/582; 345/587; 345/607; 345/653
(58) Field of Classification Search .......... 345/582, 345/587, 607, 421, 419, 428, 653–656
See application file for complete search history.

(56) References Cited

U.S. PATENT DOCUMENTS

| 6,075,538 | A | 6/2000 | Shu et al. |
| 6,100,893 | A | 8/2000 | Ensz et al. |
| 6,424,351 | B1 | 7/2002 | Bishop et al. |
| 6,525,731 | B1 | 2/2003 | Suits et al. |
| 6,831,642 | B2 | 12/2004 | Mech |
| 6,954,202 | B2 | 10/2005 | Han et al. |

OTHER PUBLICATIONS

Buehler et al., C. , "Unstructured Lumigraph Rendering," published at SIGGRAPH 2001, Los Angeles, CA, Aug. 2001 (8 pages).
Rheingans et al., Volume Illustration: Nonphotorealistic Rendering of Volume Models, IEEE Transactions on Visualization and Computer Graphics, vol. 7, No. 3 Jun. 9, 2001, pp. 253-264.
Sander et al., P.V., "Silhouette Clipping," published at SIGGRAPH 2000, new Orleans, LA, Jul. 2000 (8 pages).

Primary Examiner — Hau Nguyen
(74) Attorney, Agent, or Firm — Sterne, Kessler, Goldstein & Fox P.L.L.C.

(57) ABSTRACT

A system and method for rendering with an object proxy. In one embodiment, a method includes forming a set of view textures corresponding to a set of viewing directions; selecting a viewing direction for rendering; selecting at least two view textures from the formed set based on the selected viewing direction; and rendering the object proxy at the selected viewing direction. The rendering step includes applying texture from the selected view textures onto the selected object proxy. The view texture set forming step includes: calculating texture coordinates for the object proxy based on the level of obstruction at different portions of the object proxy and texture packing data; and drawing portions of the object based on the level of obstruction data for the object proxy and based on the texture packing data to obtain a view texture at the selected viewing direction.

5 Claims, 15 Drawing Sheets

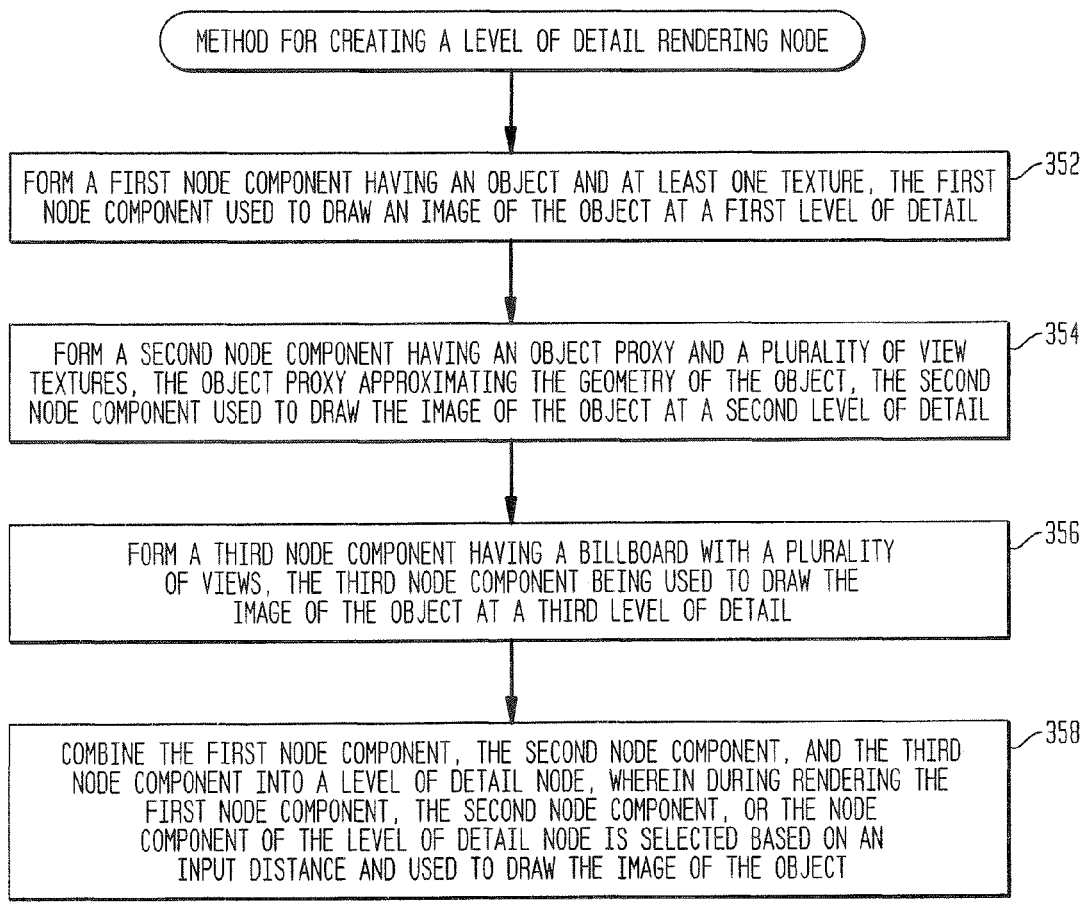

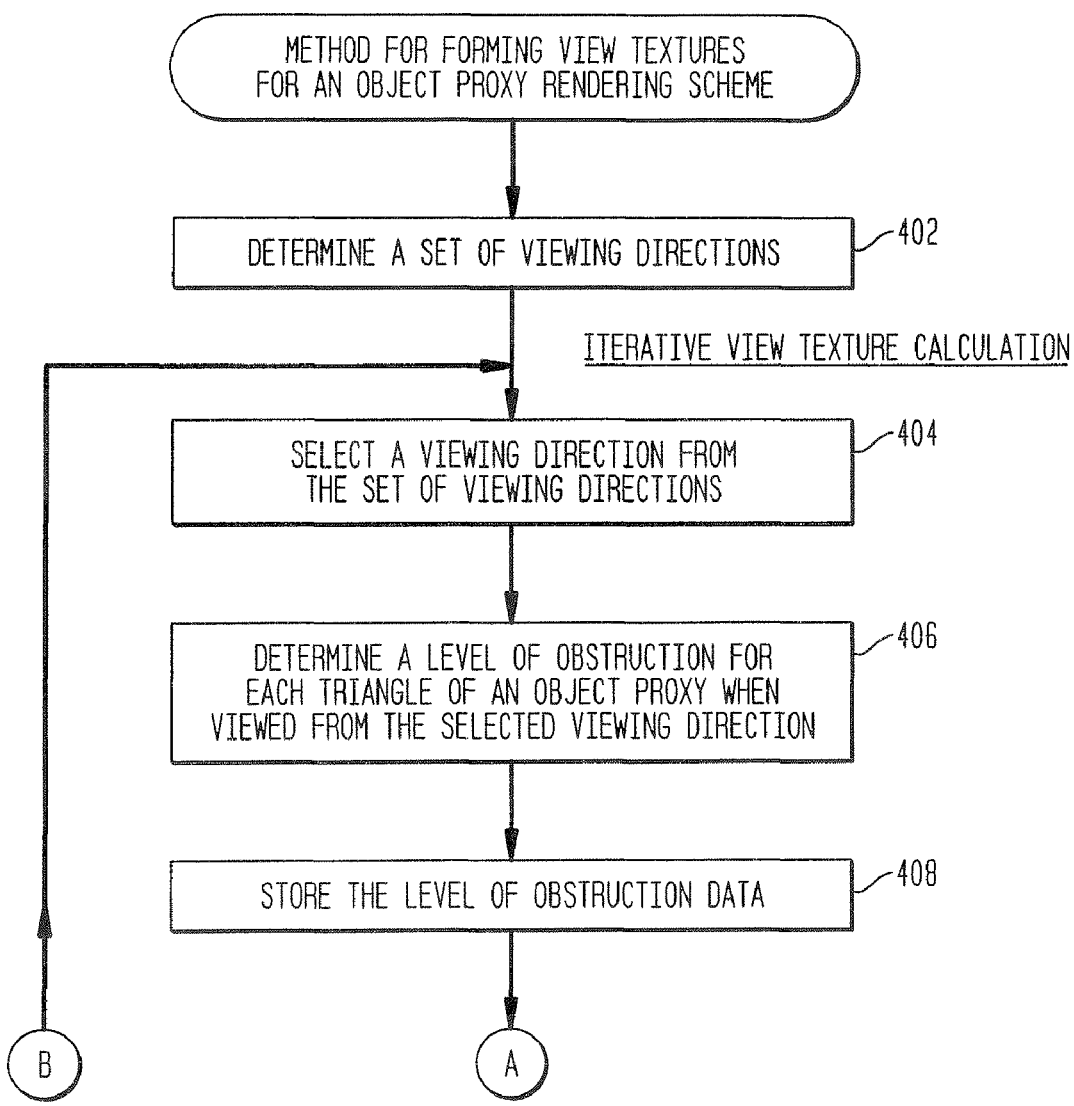

EXAMPLE VIEWING DIRECTIONS

SYSTEM AND METHOD FOR IMAGE-BASED RENDERING WITH OBJECT PROXIES

CROSS-REFERENCE TO RELATED APPLICATIONS

This application is a divisional of U.S. application Ser. No. 12/050,104, filed Mar. 17, 2008, now allowed, which is a divisional of U.S. application Ser. No. 10/197,845, filed Jul. 19, 2002, now U.S. Pat. No. 7,362,335, both of which are incorporated by reference herein in their entirety. This application is related to a commonly-owned application by Mech, "System and Method for Forming an Object Proxy," U.S. application Ser. No. 10/197,822, filed Jul. 19, 2002, now U.S. Pat. No. 6,831,642, and incorporated by reference herein in its entirety.

BACKGROUND OF THE INVENTION

1. Field of the Invention

The present invention relates to computer graphics.

2. Related Art

A wide variety of applications rely on computer graphics to generate images. An image is made up of an array of picture elements (pixels) and can be displayed on a display unit, such as, a monitor, screen, or cathode ray tube. Images often include graphical representations of objects. Many different types of computing devices with graphics capabilities are used to generate images. Such computing devices use graphics processing. A combination of software, firmware and/or hardware is used to implement graphics processing. For example, graphics processing including rendering can be carried out in a graphics card, graphics subsystem, graphics processor, graphics or rendering pipeline, and/or a graphics application programming interface (API) and libraries, such as, OPENGL.

In computer graphics, the geometry of an object is represented by primitives. Common primitives are points, lines, and polygons such as triangles or quads. Each primitive is made up of points called vertices. Each vertex includes information relating to the object and its graphical display as an image. For example, vertex information can include, but is not limited to, vertex coordinates, texture coordinates, an alpha value, and a depth value. Vertex coordinates define the location of a respective vertex in a three-dimensional coordinate space (x,y,z), such as, an object coordinate space or a world coordinate space. In this way, vertex coordinates define the geometry of an object surface. Texture coordinates are coordinates that map to an image in a two-dimensional space (s,t) or a three-dimension space (r,s,t). One way this image (also called a texture) is used in graphics processing is to provide additional surface detail to the object. An alpha value is used to represent transparency information. The depth value is used to define depth information.

Increasing demands are being made upon graphics processing. These demands include realism, speed and cost. Realistic images are desired to be rendered at real-time, interactive rates while avoiding burdensome graphics processing or hardware requirements. One way to achieve more realism is to use complex objects. Complex objects, however, can involve a large number of primitives. For example, hundred, thousands, or millions of triangles may be needed to represent complex objects. This increases the number of calculations and other processing work required to fully render the object.

Billboard image-based rendering algorithms have been used as an alternative to full rendering of objects. In such a billboard approach object data is rendered as if it were mapped or tiled on a flat plane or "billboard." The billboard approach, however, sacrifices realism and geometry detail. Accordingly, its usefulness is limited to objects viewed from afar unless hundreds of pre-computed texture images are used exceeding the limits of texture hardware. The billboard approach also generally requires many pre-computed texture images.

There is a needed for a method and system for rendering that provides an intermediate level of rendering quality in between full object rendering and a billboard rendering. Others have approached this problem by using proxy structures for complex objects. These approaches are limited, however, in that they cannot deal with concave proxies and their rendering algorithms are not well suited for mixing image-based rendering objects with regular scenes. Furthermore, the rendering algorithms of these approaches are complex and too slow for many if not all real-time rendering environments. Thus, the approaches of others to this problem have not been successful in fulfilling the need for a method and system for rendering that provides an intermediate level of rendering quality in between full object rendering and a billboard rendering.

SUMMARY OF THE INVENTION

The present invention overcomes each of the above-identified problems and has additional advantages as described herein. The present invention leverages object proxies to provide an intermediate level of rendering quality.

The present invention provides a system and method for rendering an object proxy. In one embodiment, a method includes the steps of: forming a set of view textures corresponding to a set of viewing directions; selecting a viewing direction for rendering; selecting at least two view textures from the formed set based on the selected viewing direction; and rendering the object proxy at the selected viewing direction. The rendering step includes applying texture from the selected view textures onto the selected object proxy. This rendering can include, but is not limited to, image-based rendering. Multiple object proxies can be used. One or more objects can be rendered in a single scene or frame for display or animation, or other applications.

According to one feature, a pre-computed view texture is a texture according to the invention that contains view information for an associated pre-computed object proxy. In embodiments, a view texture according to the invention comprises a pre-rendered full view image of an object of interest and pre-rendered extra texture patches associated with partially obstructed or fully obstructed polygons of the object proxy. This view information is used during rendering to draw the object of interest in a scene. A pre-computed object proxy is a simplification of an object boundary or contour.

According to one embodiment, the view texture set forming step includes: calculating texture coordinates for the object proxy based on the level of obstruction at different portions of the object proxy and texture packing data; and drawing portions of the object based on the level of obstruction data for the object proxy and based on the texture packing data to obtain a view texture at the selected viewing direction.

In one example, this drawing step includes: (i) drawing the portions of the object that correspond to unobstructed front-facing portions of the object proxy with additional displacement based on corresponding texture packing data; (ii) drawing the portions of the object that correspond to at least partially obstructed front-facing portions of the object proxy with additional displacement based on corresponding texture packing data and removal of any intervening object portions;

and (iii) drawing the portions of the object that correspond to back-facing portions of the object proxy that are visible from nearby viewing directions with additional displacement based on corresponding texture packing data and removal of intervening object portions, whereby a view texture having texture patches can be obtained.

In one embodiment, a view texture set forming step includes: (i) selecting a particular viewing direction from a set of viewing directions; (ii) determining level of obstruction data for each polygon of an object proxy; (iii) storing the level of obstruction data; (iv) for each polygon, determining whether the polygon is visible from the selected particular viewing direction and whether texture should be applied from a neighboring viewing direction; (v) determining texture packing data; and (vi) storing the texture packing data. The view texture set forming step further includes (vii) adjusting texture coordinates of each polygon for the selected particular viewing direction based on said determining step (iv) and said texture packing data.

Any type of texture packing technique and data can be used with the present invention. In one embodiment, the texture packing data comprises shift and rotation data relative to a viewing direction which is used in a texture packing algorithm to create texture patches.

According to a feature of the present invention, the method can include storing the object proxy together with a set of texture coordinates for each viewing direction of the set of viewing directions. Alternatively, the method can include forming groups of viewing directions, and storing a modified object proxy together with a set of texture coordinates for each group of viewing directions.

The present invention also provides a system for rendering an object proxy. The object proxy approximates the geometry of a respective object. In one embodiment, the system includes a view texture former and a renderer. The view texture former forms a set of view textures corresponding to a set of viewing directions. The renderer renders the object proxy at a viewing direction with texture applied from view textures selected from the set of view textures.

In one example, the view texture former includes an object proxy texture coordinate calculator and a drawer. The object proxy texture coordinate calculator calculates texture coordinates for the object proxy based on the level of obstruction at different portions of the object proxy and based on texture packing data. The drawer draws portions of the object based on the level of obstruction data for the object proxy and based on the texture packing data to obtain a view texture at a respective viewing direction. Further, in one example implementation a drawer is provided that draws the portions of the object that correspond to unobstructed front-facing portions of the object proxy with additional displacement based on corresponding texture packing data, draws the portions of the object that correspond to at least partially obstructed front-facing portions of the object proxy with additional displacement based on corresponding texture packing data and removal of any intervening object portions, and draws the portions of the object that correspond to back-facing portions of the object proxy that are visible from nearby viewing directions with additional displacement based on corresponding texture packing data and removal of intervening object portions, whereby a view texture having texture patches can be obtained.

Rendering based on the use of object proxies according to the present inventions has advantages. First, such rendering with the use of object proxies according to the present invention is faster and less expensive than fully rendering objects based on object geometry data. This is especially true for complex objects with large numbers of polygons. On the other hand, rendering with the use of object proxies according to the present invention provides more surface detail and realism than conventional approaches that render to a billboard. In this way, the present invention allows rendering of one or more objects based on their object proxies to be carried out for display or animation in real-time at an interactive rate even on cheaper graphics hardware.

The present invention also provides level of detail rendering and a method for creating a level of detail rendering node. In an embodiment, a level of detail rendering node is created by combining three node components. A first node component includes an object and at least one texture. This first node component is used to draw an image of the object at a first level of detail having high resolution. Typically, the first node component is used to draw images of the object that are close to a viewer of a scene. A second node component includes an object proxy and a plurality of view textures. The object proxy approximates the geometry of the object. The second node component is used to draw the image of the object at a second level of detail having intermediate resolution. A third node component includes a billboard with several small views. The third node component is used to draw the image of the object at a third level of detail having low resolution. Typically, the third node component is used to draw images of the object that are far from the viewer. During rendering, the first node component, the second node component, or the node component of the level of detail node is selected and used to draw the image of the object based on an input distance. In embodiments, the input distance is the distance between the image of the object and the viewer.

Further embodiments, features, and advantages of the present invention, as well as the structure and operation of the various embodiments of the present invention are described in detail below with reference to accompanying drawings.

BRIEF DESCRIPTION OF THE FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

FIG. 3B illustrates a flowchart of a method for creating a level of detail rendering node according to an embodiment of the invention.

FIGS. 4A-4D illustrate a flowchart of a method for forming view textures according to an embodiment of the invention.

DETAILED DESCRIPTION OF THE INVENTION

The present invention provides a method, a system, and a computer program product for image-based rendering with object proxies. An object proxy is a simplification of an object boundary that is useful for hardware-accelerated image-based rendering. As described herein, image-based rendering with object proxies according to the present invention makes it possible both to render more image-based objects in a single computer generated scene and to render these image-based objects using fewer views/textures than conventional image-based rendering schemes.

Terminology

The following terms are defined so that they may be used to describe embodiments of the present invention. As used herein:

"Pixel" means a data structure, which is used to represent a picture element. Any type of pixel format can be used.

"Real-time" or "Interactive Rate" refers to a rate at which successive display images can be redrawn without undue delay upon a user or application. This can include, but is not limited to, a nominal rate of between 30-60 frames/second. In some example embodiments, such as some flight simulators or some interactive computer games, an interactive rate may be approximately 10 frames/second. In some examples, real-time can be one update per second.

"Texture" means an array of texels. A texel can be a color or an intensity value. A texture can be any array of values that is used to determine a value for a pixel. As used herein, the term "texture" includes, for example, texture maps, bump maps, and gloss maps.

"Texel" means a texture element.

"Texture sample" means a sample selected from a texture map or texture. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample or a filtered texture sample) from a texture. A texture unit can in some instances obtain multiple texture samples from multiple textures.

Example Architecture of the Invention

Figure 1:
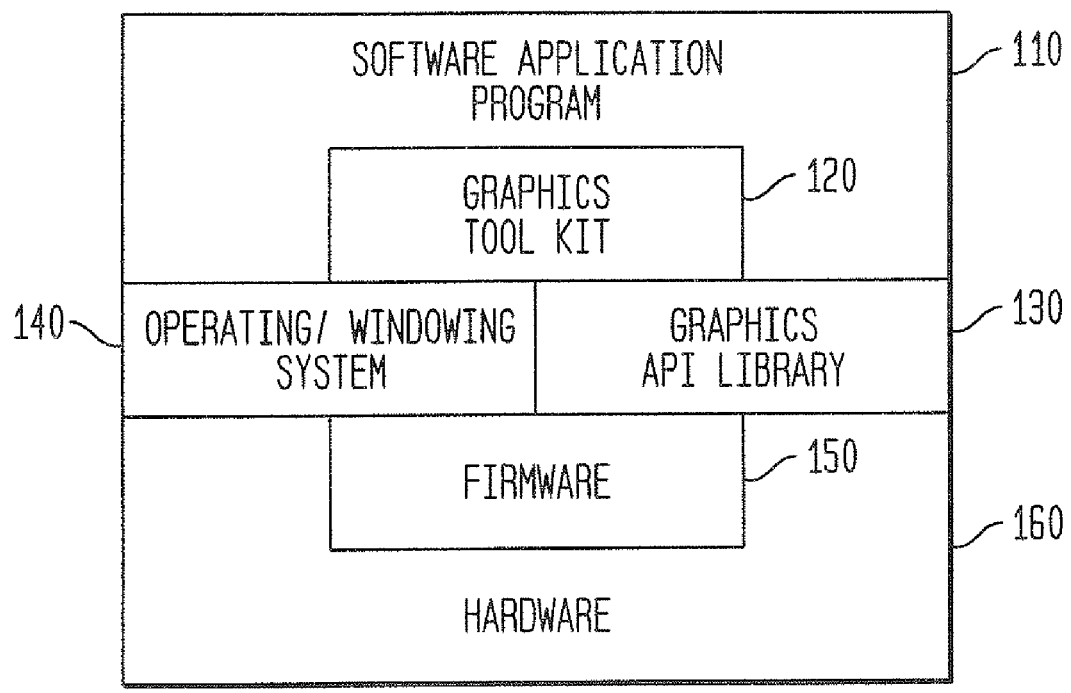
FIG. 1 illustrates an example architecture in which the invention can be implemented.

FIG. 1 illustrates a block diagram of an example computer architecture 100 in which the various features of the present invention can be implemented. It is an advantage of the invention that it may be implemented in many different ways, in many environments, and on many different computers or computer systems.

Architecture 100 includes six overlapping layers. Layer 110 represents a high level software application program. Layer 120 represents a three-dimensional (3D) graphics software tool kit, such as OPENGL PERFORMER. Layer 130 represents a graphics application programming interface (API), which can include but is not limited to OPENGL, available from Silicon Graphics, Incorporated. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 110-160 of architecture 100 will be available in most commercially available computers.

As will be apparent to a person skilled in the relevant art after reading the description of the invention herein, various features of the invention can be implemented in any one of the layers 110-160 of architecture 100, or in any combination of layers 110-160 of architecture 100.

Example System Embodiment of the Present Invention

Figure 2:
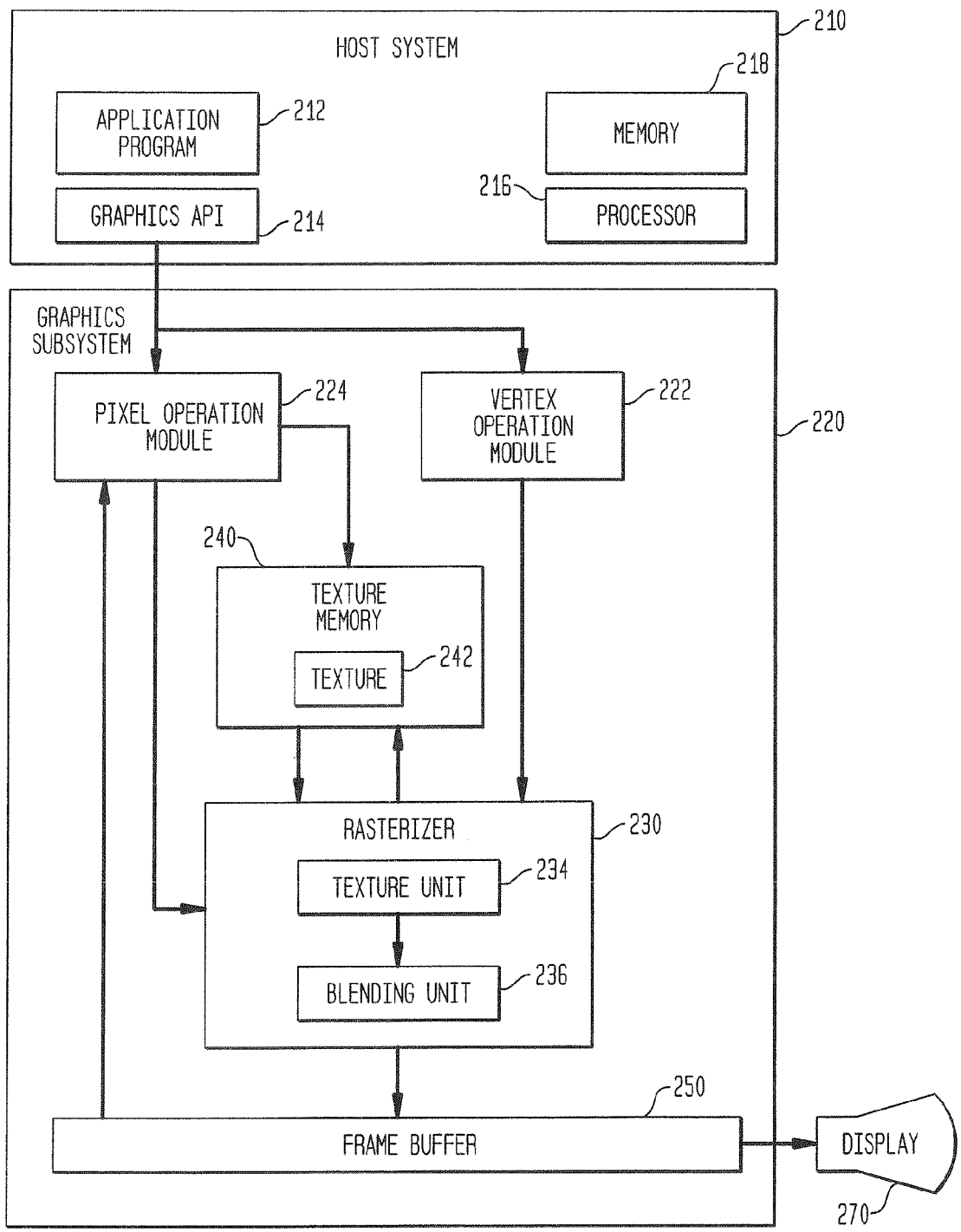
FIG. 2 illustrates an example system according to an embodiment of the invention.

FIG. 2 illustrates an example graphics system 200 according to an embodiment of the present invention. Graphics system 200 comprises a host system 210, a graphics subsystem 220, and a display 270. Each of these features of graphics system 200 is further described below.

Host system 210 comprises an application program 212, a hardware interface or graphics API 214, a processor 216, and a memory 218. Application program 212 can be any program requiring the rendering of a computer image. The computer code of application program 212 is executed by processor 216. Application program 212 assesses the features of graphics subsystem 220 and display 270 through hardware interface or graphics API 214. Memory 218 stores information used by application program 212.

Graphics subsystem 220 comprises a vertex operation module 222, a pixel operation module 224, a rasterizer 230, a texture memory 240, and a frame buffer 250. Texture memory 240 can store one or more textures or images, such as texture 242. Texture memory 240 is connected to a texture unit 234 by a bus (not shown). Rasterizer 230 comprises a texture unit 234 and a blending unit 236. Texture unit 234 and blending unit 236 can be implemented separately or together as part of a graphics processor. The operation of these features of graphics system 200 would be known to a person skilled in the relevant art given the description herein.

In embodiments of the present invention, texture unit 234 can obtain multiple point samples or multiple filtered texture samples from textures and/or images stored in texture memory 240. Blending unit 236 blends texels and/or pixel values according to weighting values to produce a single texel or pixel. The output of texture unit 238 and/or blending unit 236 is stored in frame buffer 250. Display 270 can be used to display images stored in frame buffer 250.

The embodiment of the invention shown in FIG. 2 has a multipass graphics pipeline. It is capable of operating on each pixel of an image (object) during each pass that the image makes through the graphics pipeline. For each pixel of the image, during each pass that the image makes through the graphics pipeline, texture unit 234 can obtain at least one texture sample from the textures and/or images stored in texture memory 240. Although the embodiment of the invention shown in FIG. 2 has a multipass graphics pipeline, it is noted here that other embodiments of the invention do not have a multipass graphics pipeline. As described below, method embodiments of the invention can be implemented using systems that do not have a multipass graphics pipeline.

Example Method Embodiments of the Present Invention

Figure 3A:
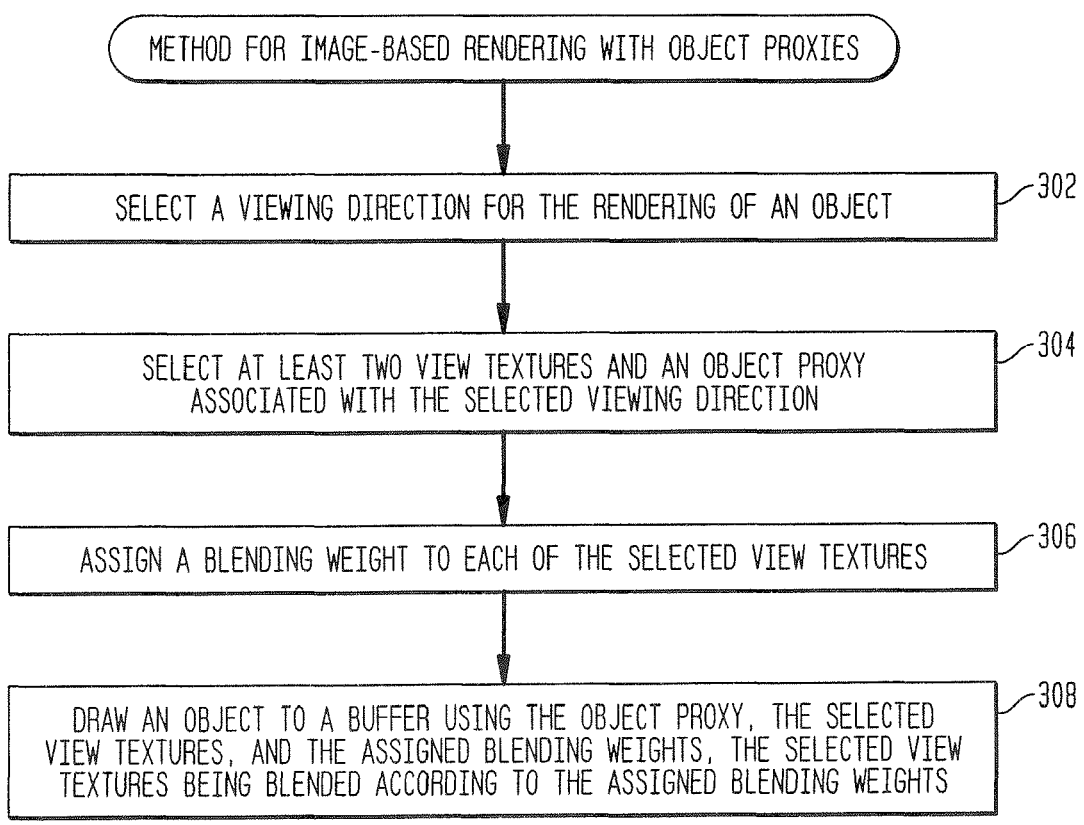
FIG. 3A illustrates a flowchart of a method for image-based rendering with object proxies according to an embodiment of the invention.
Figure 4B:
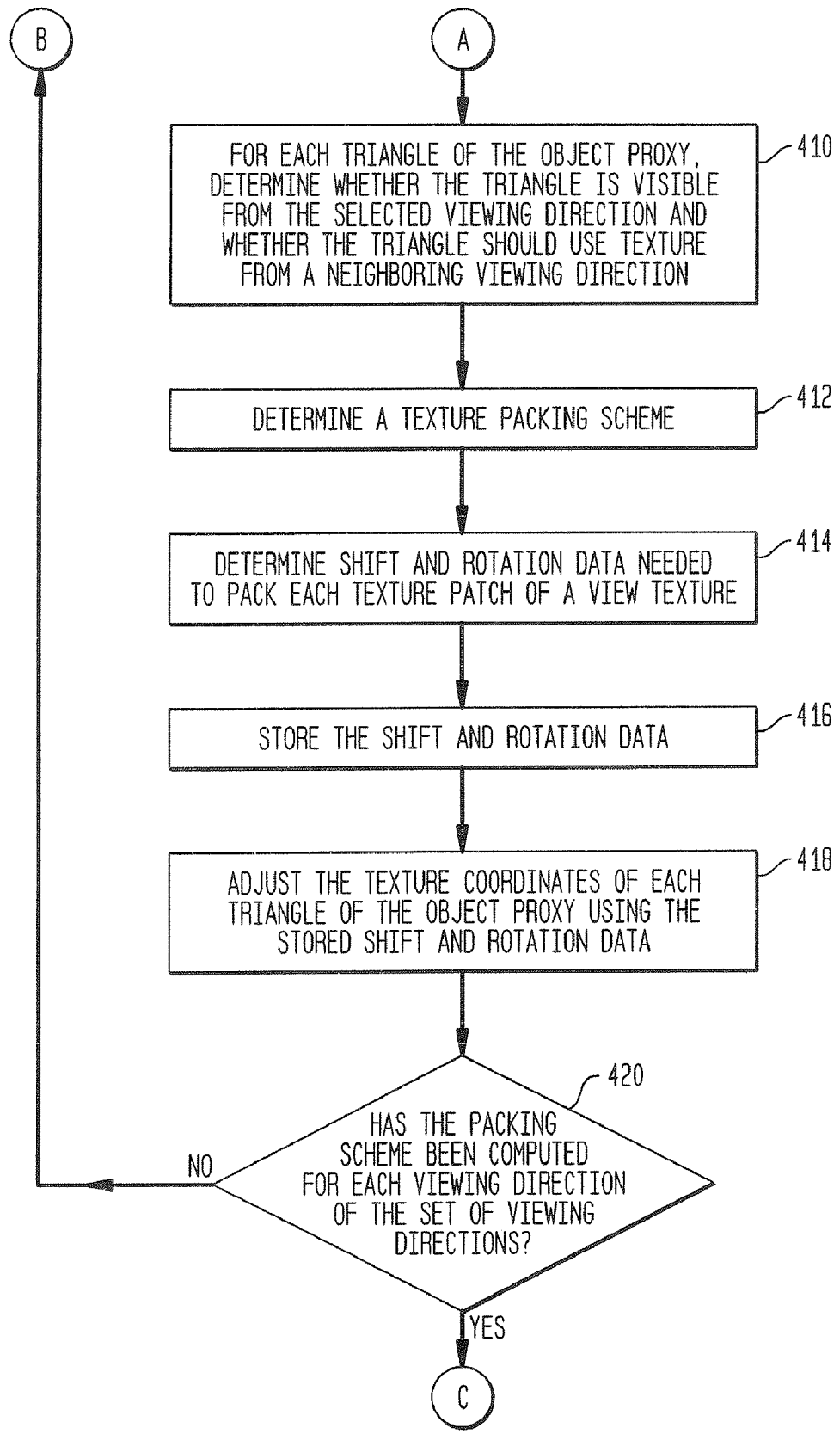
Figure 4C:
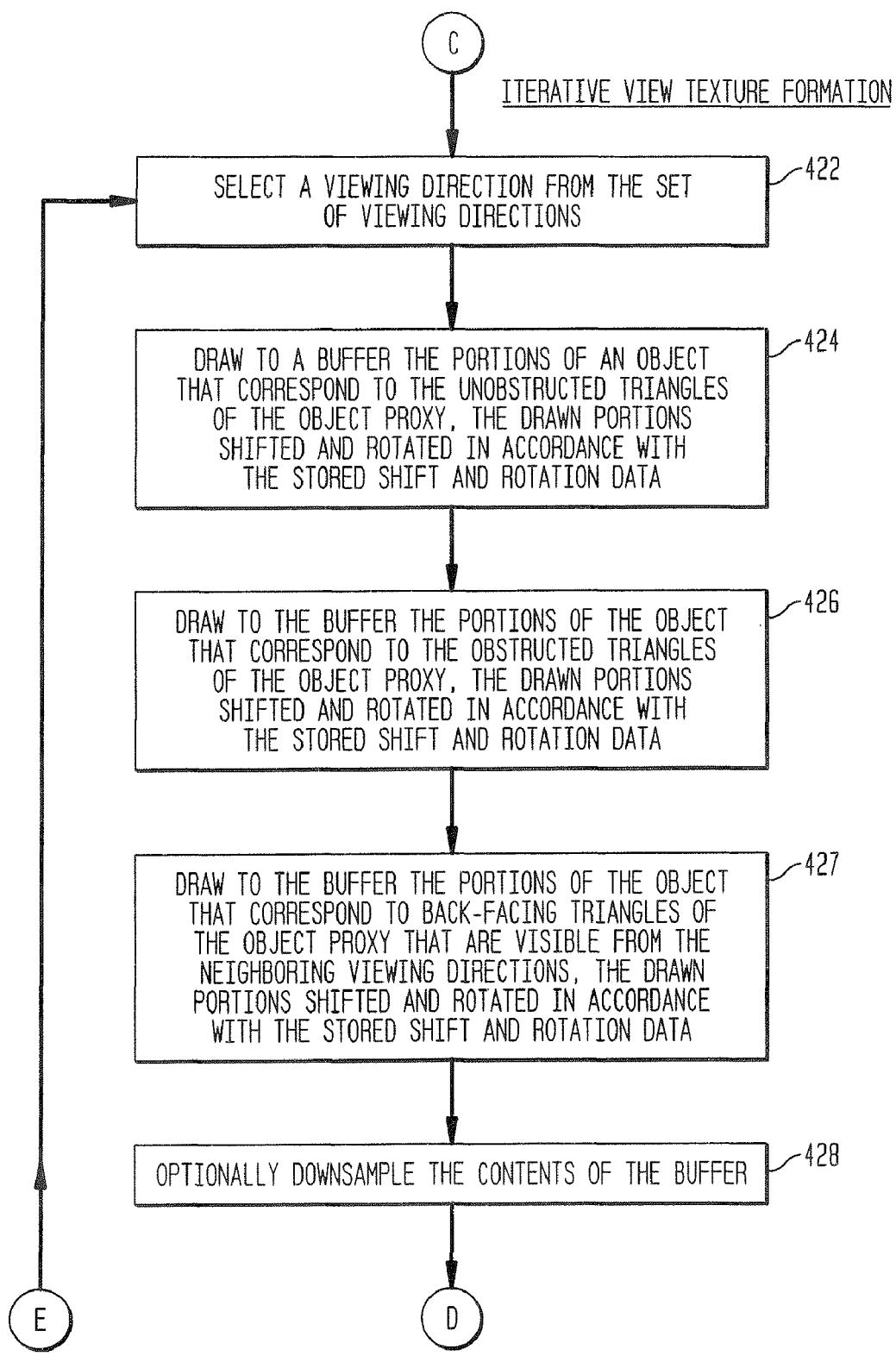
Figure 4D:
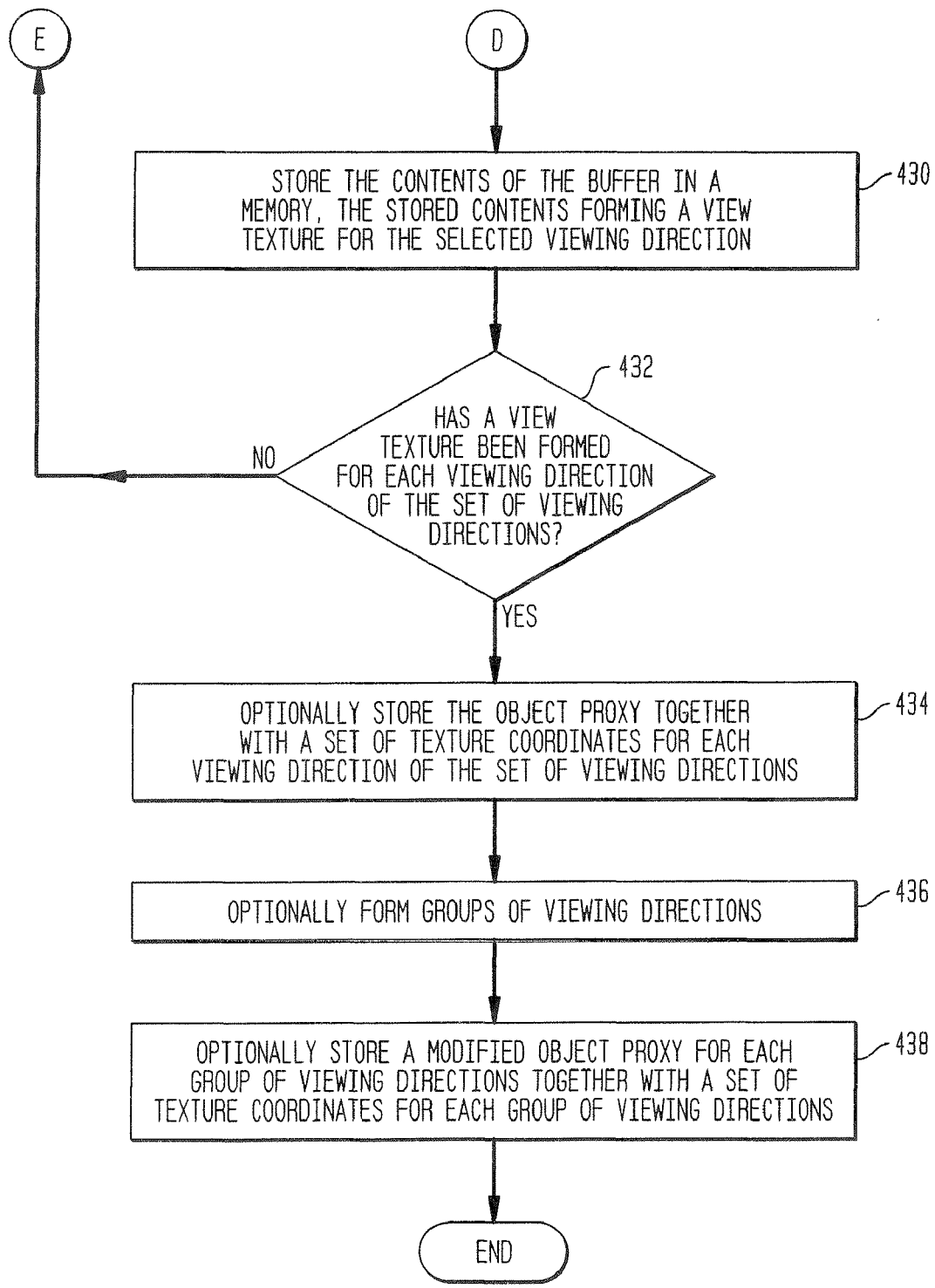

FIG. 3A illustrates a flowchart of a method 300 for image-based rendering with object proxies according to an embodiment of the invention. As noted above, an object proxy is a simplification of an object boundary that is useful for hardware-accelerated image-based rendering. Image-based rendering with object proxies according to the present invention makes it possible both to render more image-based objects in a single computer generated scene and to render these image-based objects using fewer views/textures than conventional image-based rendering schemes.

In an embodiment, method 300 operates as follows. A viewing direction for rendering an object is chosen. Next, at least two pre-computed view textures and a pre-computed object proxy associated with the chosen viewing direction are selected. Blending weights are assigned to each of the selected view textures. The object is then drawn to a buffer using the selected object proxy, the selected view textures, and the assigned blending weights. The selected view textures are blended during rendering in accordance with the assigned blending weights.

As illustrated in FIG. 3A, method 300 comprises steps 302, 304, 306, and 308. Each of these steps will now be described in further detail with reference to the flowchart of FIG. 3A.

Figures 6, 7:
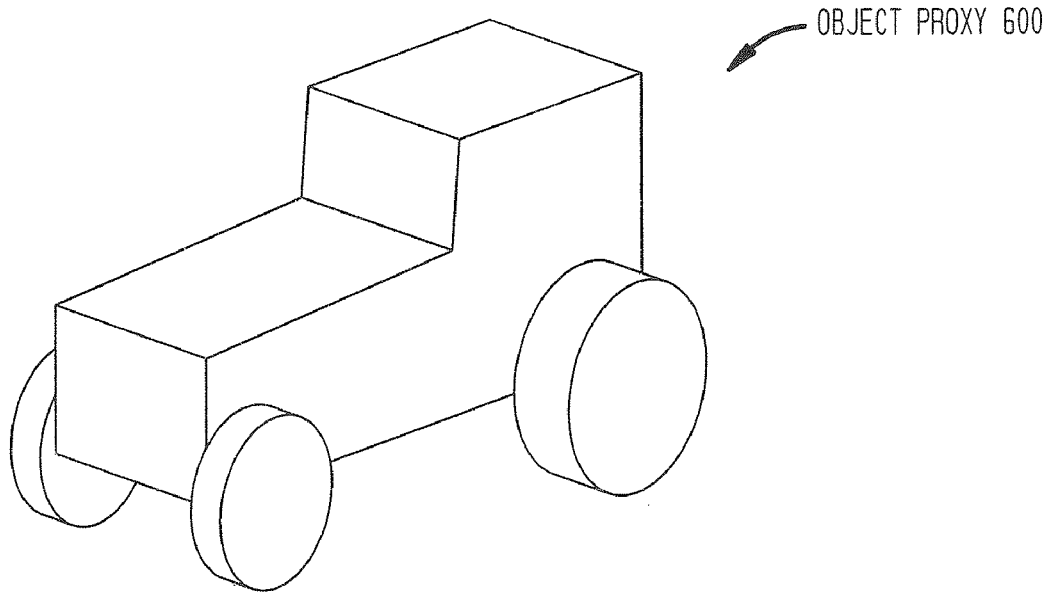
FIG. 6 illustrates an example object proxy for the object of FIG. 5 according to an embodiment of the invention.
FIG. 7 illustrates example viewing directions around an object proxy according to an embodiment of the invention.

In step 302, as noted above, a viewing direction for rendering the object of interest is selected. As used herein, viewing direction means the direction from which the object will appear to be seen by a viewer after it is drawn or rendered. The viewing direction selected in step 302 can be any arbitrary direction. FIG. 7 illustrates several example viewing directions associated with an object proxy 700.

In step 304, at least two pre-computed view textures and an associated pre-computed object proxy are selected. As used herein, a pre-computed view texture is a texture according to the invention that contains view information for an associated pre-computed object proxy. In embodiments, a view texture according to the invention comprises a pre-rendered full view image of an object of interest and pre-rendered extra texture patches associated with partially obstructed or fully obstructed polygons of the object proxy. This view information is used during rendering to draw the object of interest in a computer scene. A pre-computed object proxy, as described above, is a simplification of an object boundary that is useful for hardware-accelerated image-based rendering.

In accordance with the invention, view textures are pre-computed for particular views of an object or object proxy. Thus, each pre-computed view texture has an associated viewing direction. For example, a particular view texture can be associated with either a front view of an object, a side view of an object, or a top view of an object. A method 400 for forming a set of view textures for a pre-computed object proxy according to an embodiment of the invention is described below with reference to FIGS. 4A-4D.

In embodiments of the invention, object proxies pre-computed in accordance with the methods described by Mech in U.S. patent application Ser. No. 10/197,822, filed Jul. 19, 2002, now U.S. Pat. No. 6,831,642, entitled "Method and System for Forming an Object Proxy," which is incorporated herein by reference in its entirety, are used with the method 300 of the present invention. In U.S. patent application Ser. No. 10/197,822, for example, a method includes forming a volume that encompasses the object, forming an isosurface within the volume, adjusting the isosurface relative to a surface of the object, and pruning the isosurface to obtain the object proxy. The present invention is not limited, however, to using just the object proxies described by Mech in U.S. patent application Ser. No. 10/197,822, now U.S. Pat. No. 6,831,642. In general, object proxies computed by any means can be used with method 300 of the present invention.

In embodiments of the invention, the three or the four closest view textures to the viewing direction selected in step 302 are chosen in step 304. As described below with reference to FIGS. 13 and 14, viewing directions can be thought of as defining points on the surface of a unit sphere. Thus, the viewing direction selected in step 302 and the viewing directions associated with individual view textures can also be thought of as points on a unit sphere. If these points on the unit sphere are triangulated, each spherical triangle defines a group of views, a group of view textures, and/or a group of viewing directions. Similarly, if the viewing directions are thought of as defining rings of views, with each ring having the same angle from a horizontal plane, the two nearest point in two neighboring rings also define a group of views, a group of view textures, and/or a group of viewing directions. Therefore, in embodiments, the three or the four points on a unit sphere, for which pre-computed view textures exist, that are closest to the point representing the viewing direction selected in step 302 are used to determine which view textures are selected in step 304.

In one embodiment, the three points representing the vertices of a spherical triangle, into which the point representing the selected viewing direction falls, are used to select the view textures in step 304. In another embodiment, wherein rings of views are used, the two nearest rings and the two nearest points on each ring closest to the selected viewing direction point, for which pre-computed view textures exists, are used to select four view textures in step 304. In general, any technique can be used to select view textures in step 304 that are nearest to the viewing direction selected in step 302.

As described herein, pre-computed view textures are associated with a particular pre-computed object proxy. Thus, the object proxy selected in step 304 is the object proxy associated with the selected view textures.

In step 306, blending weights are assigned to each view texture selected in step 304. In embodiments, for example, where three nearest view textures are selected in step 304, the weights assigned to the selected view textures are determined using barycentric coordinates of the viewing direction point inside a spherical triangle. In embodiments, for example, where four nearest view textures are selected in step 304, the weights assigned to the selected view textures are determined based on the distances from the rings and from the view textures in the rings. In general, any technique that defines continuous and linear weights across a group of view textures can be used to assign the weights in step 306.

In step 308, the object of interest is drawn to a buffer using the selected object proxy of step 304, the selected view textures of step 304, and the assigned blending weights of step 306. The selected view textures are blended during the rendering or drawing of the object in accordance with the assigned blending weights.

In one embodiment, using a multipass graphics pipeline and for which three view textures are to be combined, the object is drawn to the buffer as follows. During a first pass, object proxy polygons (e.g. triangles) are rendered into an alpha channel of the buffer using the first selected view texture and its assigned blending weight. During this first pass, overwrite the contents of the alpha channel. During a second pass, object proxy polygons are rendered into the alpha channel of the buffer using the second selected view texture and its assigned blending weight, blending this result with the result of the first pass. During a third pass, object proxy polygons are rendered into an alpha channel of the buffer using the third selected view texture and its assigned blending weight, blending this result with the result of the second pass. During a fourth pass, object proxy polygons are rendered into a color channel of the buffer using the first selected view texture and its assigned blending weight, and blending this result with the background colors using the values in the alpha channel. During a fifth pass, object proxy polygons are rendered into the color channel of the buffer using the second selected view texture and its assigned blending weight, adding this result to the result of the fourth pass. During a sixth pass, object proxy polygons are rendered into the color channel of the buffer using the third selected view texture and its assigned blending weight, adding this result to the result of the fifth pass. In another embodiment, using hardware with register combiners, the steps described above can be performed in a single pass through the graphics pipeline by appropriately setting the register combiners.

It is a feature of method 300 that it can be used to create various rendering steps in between, for example, the full rendering of a complex object and billboard image-based rendering. This is due, in part, to the fact that method 300 can be used with an object proxy having fewer images than a billboard rendering scheme but less geometry than a full version of an object of interest. By creating several rendering steps between these two extremes in accordance with the invention, it is possible to create several levels of detail that are used based on distances between a viewer and the rendered object. For example, at close distances, a full version of the object is used in rendering. As the viewer of the scene moves away from the object, an object proxy having the appropriate level of detail is selected from a group of proxies and used in rendering. This group of proxies include more complex proxies having a limited number of associated view textures and less complex proxies having a large number of associated view textures. At large distances, a billboard with many small views is used in rendering.

FIG. 3B illustrates a flowchart of a method 350 for creating a level of detail rendering node according to an embodiment of the invention. As illustrated in FIG. 3B, method 350 comprises four steps 352, 354, 356, and 358. Each of these steps will now be described with reference to FIG. 3B.

In step 352, a first node component having an object and at least one texture is formed. The first node component is used to draw an image of the object at a first level of detail having high resolution. Typically, the first node component is used to draw images of the object that are close to a viewer.

In step 354, a second node component having an object proxy and a plurality of view textures is formed. As described herein, the object proxy approximates the geometry of the object. The second node component is used to draw the image of the object at a second level of detail having intermediate resolution.

In embodiments of the invention, additional node components similar to the second node component are also foamed. These node components have object proxies of varying numbers of polygons (e.g., triangles), and they have varying numbers of view textures. These additional node components, when formed, increase the levels of detail available and provide additional intermediate levels of rendering quality in between full object rendering and a billboard rendering.

In step 356, a third node component having a billboard with several small views is formed. The third node component is used to draw the image of the object at a third level of detail having low resolution. Typically, the third node component is used to draw images of the object that are far from the viewer.

In step 358, the first node component, the second node component, and the third node component are combined into a level of detail node. During rendering, the first node component, the second node component, or the node component of the level of detail node is selected and used to draw the image of the object based on an input distance.

In embodiments having several additional node components similar to the second node component, all of the node components are combined to form the level of detail node.

In embodiments, the input distance is the distance between the image of the object and the viewer. Thus, when the viewer is close to the image of the object, the image is drawn in the scene using the object of the first node component. In this instance, the image is drawn with high resolution. As the viewer starts walking away from the image, the distance between the image and the viewer increases. As the viewer continues to walk away from the image of object, at some point the level of detail rendering node starts using the object proxy of the second node component rather than the object of the first node component to drawn the image in the scene. In this instance, the image is drawn with medium resolution. As the viewer walks further and further away from the image of the object, at some point the level of detail rendering node starts using the billboard of the third node component to drawn the image in the scene with low resolution. In embodiments having graphics hardware that supports blending between different levels of detail, the transitions between the node components of the level of detail node are seamless.

The advantages of this feature and other features of the invention will be apparent to persons skilled in the relevant computer art given the description herein.

FIGS. 4A-4D illustrate a flowchart of a method 400 for forming view textures according to an embodiment of the invention. As illustrated in FIGS. 4A-4D, method 400 includes steps 402-438. Steps 404, 406, 408, 410, 412, 414, 416, 418, and 420 are performed in a first loop. Steps 422, 424, 426, 427, 428, and 430 are performed in a second loop. Steps 428, 434, 436, and 438 are optional steps. These steps will now be described with reference to FIGS. 4A-4D.

In step 402, a set of viewing directions is determined for an object proxy. The set of viewing directions can be determined in any chosen manner. For example, as illustrated by FIG. 7, in embodiments the viewing directions can be chosen to be uniformly distributed in two-dimensions or three-dimensions about the object proxy. In other embodiments, the set of viewing directions are not chosen to be uniformly distributed about the object proxy. In some embodiments, for example, more views are chosen for directions showing a lot of object details and fewer views are chosen for directions showing only minor object details. In some embodiments, more views are chosen for directions in which the geometry of the object proxy is significantly different than the geometry of the object, and fewer views are chosen for directions in which the geometry of the object proxy and the object are similar.

In step 404, one of the viewing directions is selected from the set of viewing direction chosen in step 402.

In step 406, a level of obstruction is determined for and assigned to each triangle of the associated object proxy when viewed from the viewing direction selected in step 404. In an embodiment, the numerical values 1, −1, 2, −2, 3, −3 ... N, −N are used to indicate a triangle's level of obstruction. In this embodiment, the numerical value 1 is assigned to a triangle that is front-facing and that is not obstructed by another triangle. The numerical value −1 is assigned to a triangle that is back-facing and obstructed by a single front-facing triangle (i.e., a level 1 triangle). The numerical value 2 is assigned to a triangle that is front-facing and obstructed by a single front-facing triangle (a level 1 triangle) and a single back-facing triangle (a level −1 triangle). The numerical value −2 is assigned to a triangle that is back-facing and obstructed by two front-facing triangles (a level 1 triangle and a level 2 triangle) and a single back-facing triangle (a level −1 triangle). In general, a triangle having a level of obstruction N is obstructed by N−1 front-facing triangles and N−1 back-facing triangles. A triangle have a level of obstruction −N is obstructed by N front-facing triangles and N−1 back-facing triangles.

In step 408, the level of obstruction data determined in step 406 is stored. In an embodiment, this data is stored in a memory.

In step 410, for each triangle of the object proxy, it is determined whether the triangle is visible from the selected viewing direction and whether the triangle should use texture from a neighboring viewing direction. Texture from a neighboring view is used, for example, for obstructed and/or back-facing triangles that can come into view as the object proxy is rotated about an axis.

In step 412, a texture packing scheme is selected for packing the view texture. Any texture packing scheme can be selected. Preferably, the selected texture packing scheme is one that packs polygons (e.g., triangles) around an image of irregular shape.

In step 414, the shift and rotation data needed to pack each texture patch is determined. This shift and rotation data is used below in steps 418, 424, 426, and 427 to determine texture coordinates for each triangle of the object proxy.

In step 416, the shift and rotation data determined in step 414 is stored. In an embodiment, this data is also stored in a memory.

In step 418, the texture coordinates of each triangle of the object proxy are adjusted using the shift and rotation data stored in step 416. This is done so that the correct texture or texture patch will be used to render the triangles of the object proxy. In an embodiment, the shift and rotation data stored in step 416 are applied to the texture coordinates associated with the object proxy and the selected viewing direction to create new texture coordinates. These new texture coordinates then map to the correct texture or texture patch of a view texture formed in accordance with the invention.

In step 420, it is determined whether a texture packing scheme has been computed for each viewing direction of the set of viewing directions chosen in step 402. If a texture packing scheme has not been computed for each of the viewing directions, another viewing direction is selected (step 404) and the steps 406 through 418 are repeated for the newly selected viewing direction. If a texture packing scheme has been computed for each of the viewing directions, control passes from step 420 to step 422.

A reason for computing the texture packing scheme for each of the viewing directions before forming any view textures is that some of the view textures may include texture patches from neighboring view directions. If several view textures are combined into one large texture (e.g., several textures are combined to form a large N×M texture), these texture patches may be present in the combined textures and thus do not have to be packed with the current view.

In step 422, one of the viewing directions is selected from the set of viewing direction chosen in step 402. This step starts the second loop of method 400.

In step 424, the portions of the object that correspond to the unobstructed triangles of the object proxy are drawn to the buffer. These portions are shifted and rotated in accordance with the shift and rotation data stored in step 416. In an embodiment, the unobstructed portions of the object drawn in step 424 are the portions corresponding to the triangles of the object proxy having a level of obstruction value equal to 1. In embodiments, the unobstructed portion drawn in step 424 is an image of the object.

In step 426, the portions of the object that correspond to the obstructed triangles of the object proxy are drawn to the buffer. These portions are shifted and rotated in accordance with the shift and rotation data stored in step 416. In an embodiment, the obstructed portions of the object drawn in step 426 are the portions corresponding to the triangles of the object proxy having a level of obstruction value greater than 1 (i.e., 2, 3, 4, ... N).

In embodiments, the portions drawn in step 426 are texture patches corresponding to portions of the object that are either partially or fully obstructed when the object is viewed from the selected viewing direction, but that are unobstructed when the object is viewed from a neighboring view direction. This point is further described below with reference to FIGS. 6-9.

In an embodiment, the portions drawn in step 426 are drawn by rendering the object and setting a clip plane to the plane of the particular object proxy polygons/triangles that are being drawn, and setting the initial depth value by rendering object proxy triangles having levels of obstruction −N ... −L, where L is the current level of obstruction, into the depth buffer.

In step 427, the portions of the object that correspond to back-facing triangles of the object proxy are drawn to the buffer. These portions are shifted and rotated in accordance with the shift and rotation data stored in step 416. In an embodiment, the portions of the object draw in step 427 are the portions corresponding to the triangles of the object proxy having a level of obstruction value less than 1 (i.e., −2, −3, −4, ... −N).

In an embodiment, the portions drawn in step 427 are texture patches. In an embodiment, the portions drawn in step 427 are drawn by using texture from the closest neighboring viewing direction in which the back-facing triangles being drawn are front-facing.

An example implementation of steps 424, 426, and 427 using OPENGL is provided below:

```
// Clear stencil buffer and depth buffer
glClear(GL_STENCIL_BUFFER_BIT|GL_DEPTH_BUFFER_BIT);
// disable drawing into color and alpha buffer
glColorMask(GL_FALSE, GL_FALSE, GL_FALSE, GL_FALSE);
// disable updating of the depth buffer
glDepthMask(GL_FALSE);
// set stencil bits where proxy triangle is drawn
glStencilFunc(GL_ALWAYS, 1, 0xff);
glStencilOp(GL_KEEP, GL_REPLACE, GL_REPLACE);
```

```
glEnable(GL_STENCIL_TEST);
// adjust projection matrix based on the shift and rotation computed
// by the packing algorithm
glMatrixMode(GL_PROJECTION);
glLoadMatrixf((float *)adjustedProjMat.mat);
// draw the triangle T
DrawSingleProxyTriangle(T);
// draw only where stencil is set
glStencilFunc(GL_EQUAL, 1, 0xff);
glStencilOp(GL_KEEP, GL_KEEP, GL_KEEP);
// set initial depth buffer to back faces of higher level to make sure
// will not draw parts of the objects too far behind -
// for example, in the case of a case, one does not want to see a piece of
// blue windshield as a texture around the edge of the sideview mirror
glDepthMask(GL_TRUE);
DrawProxyTriangles(-maxLevel, - level of triangle T for given view);
// Note. Optionally, these triangle may be shifted back a bit so one does
// see a bit behind - to avoid some cracks
// set the clip plane to clip of parts of the original object that
// obstruct the give triangle
// clipplane is equal to the triangle T, moved a bit towards the view
glClipPlane(GL_CLIP_PLANE0, eq);
glEnable(GL_CLIP_PLANE0);
// enable drawing into color and alpha buffer
glColorMask(GL_TRUE, GL_TRUE, GL_TRUE, GL_TRUE);
// draw the original object
pfDraw( );
glDisable(GL_CLIP_PLANE0);
glDisable(GL_STENCIL_TEST);
```

The above example OPENGL implementation is illustrative and not intended to limit the present invention.

Continuing with steps 428 and 430, in optional step 428, the contents of the buffer is down-sampled. This optional step filters the contents of the buffer, if filtering is needed.

In step 430, the contents of the buffer is stored in a memory thereby forming a view texture in accordance with an embodiment of the present invention. This stored, pre-computed view texture can be read from memory and used, for example, with an object proxy in accordance with method 300 to render an object in a computer scene.

In step 432, it is determined whether a view texture has been formed for each of the viewing directions selected in step 402. If a view texture has not been formed for all of the viewing directions, another viewing direction is selected (step 422) and the steps 424 through 430 are repeated for the newly selected viewing direction. If view textures have been formed for all of the viewing directions, control passes from step 432 to optional step 434.

In optional step 434, the object proxy is stored together with a set of texture coordinates for each of the viewing textures formed in steps 424-430. In an embodiment, a single proxy shape and a set of texture coordinates is stored for each viewing direction selected in step 402. This is not the only storage arrangement that can be used in accordance with method 400. Other storage arrangements are also possible.

In optional step 436, groups of viewing directions are formed. In an embodiment, groups of three viewing directions are formed in step 434. These groups are the spherical triangle groups described herein. In another embodiment, groups of four viewing directions are formed. These groups are the ring view groups described herein. Other groupings are also possible.

In optional step 438, a modified object proxy is stored for each group of viewing directions together with a set of texture coordinates for the group of viewing directions. Thus, in embodiments, a single proxy shape and a set of texture coordinates is stored for each group of viewing directions formed in step 436. As noted herein, this is not the only storage arrangement that can be used. For example, in some embodiments of the invention, more than one object proxy with a set of textures coordinates can be associated with a particular group of viewing direction. This is particularly the case when the invention is used to implement level of detail rendering schemes, wherein the object proxy and view textures used to render an object for a given group of viewing direction are selected based on a distance criterion.

The steps described above for method 400 are illustrative of how to form a viewing texture in accordance with the invention. As noted above, several of the steps described are optional steps. These optional steps are not intended to limit the present invention.

Figure 5:
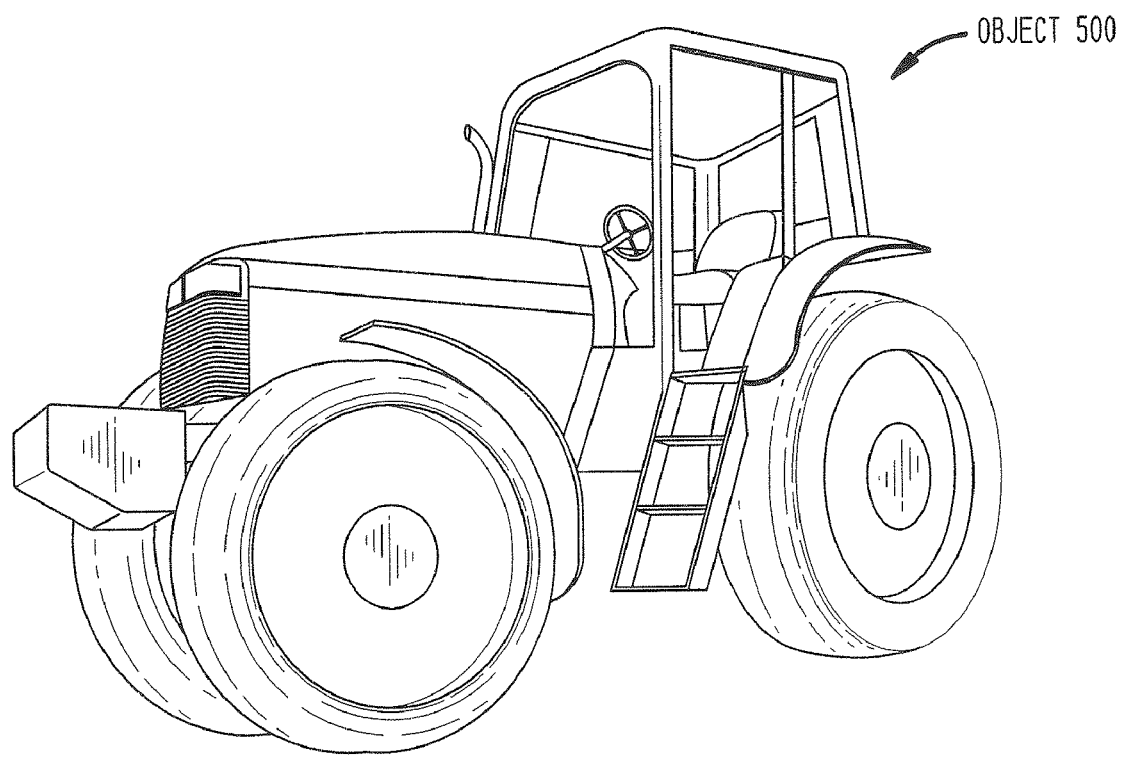
FIG. 5 illustrates an example object according to an embodiment of the invention.

FIG. 5 illustrates an example object 500 for which an object proxy can be pre-computed and used in accordance with the present invention. Object 500 is a tractor having a complex geometry.

FIG. 6 illustrates an example pre-computed object proxy 600 for the object 500 of FIG. 5. As can be seen by comparing FIGS. 5 and 6, the surface of the object proxy 600 is not as complex as the surface of the object 500. More specifically, the surface of the object proxy 600 comprises far fewer triangles than the surface of the object 500.

In an embodiment, the object proxy 600 is formed according to the methods described by Mech in U.S. patent application Ser. No. 10/197,822, filed Jul. 19, 2002, now U.S. Pat. No. 6,831,642, entitled "Method And System For Forming An Object Proxy." In U.S. patent application Ser. No. 10/197,822, for example, a method includes aiming a volume that encompasses the object, forming an isosurface within the volume, adjusting the isosurface relative to a surface of the object, and pruning the isosurface to obtain the object proxy. Other methods can also be used to form object proxies that are used in accordance with the present invention.

As described herein, many different object proxies can be formed for object 500. These different object proxies have varying degrees of complexity/numbers of triangles. Thus, the object proxy 600 is only illustrative and not intended to limit the invention described herein.

FIG. 7 illustrates example viewing directions around an object proxy 700 according to an embodiment of the invention. The viewing directions around object proxy 700 are uniformly distributed in two-dimensions. In embodiments of the invention, viewing directions are distributed in three-dimensions. In some embodiments, the viewing directions are non-uniformly distributed about the object in either two-dimensions or three-dimensions. For example, as described above with respect to step 402 of method 400, in some embodiments more views are chosen for directions showing a lot of object details, and fewer views are chosen for directions showing only minor object details. In other embodiments, more views are chosen for directions in which the geometry of the object proxy is significantly different than the geometry of the object, and fewer views are chosen for directions in which the geometry of the object proxy and the object are similar. In one embodiment, a user specifies each of the viewing directions about the object proxy.

In FIGS. 8A-8D, various views of the object 500 (i.e., images) are represented in a simplified manner. These various views can be render or drawn using the object 500 in accordance with the steps of method 400. Each view in FIGS. 8A-8D represents a view from a different viewing direction in accordance with the invention.

Figure 8D:
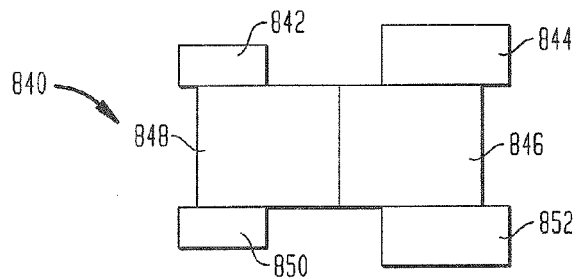
FIG. 8D illustrates an example top view of the object of FIG. 5 according to an embodiment of the invention.
Figure 8A:
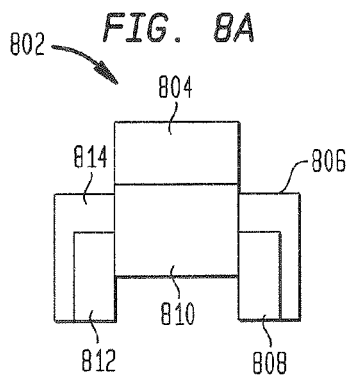
FIG. 8A illustrates an example front view of the object of FIG. 5 according to an embodiment of the invention.

FIG. 8A illustrates an example front view 802 of the object 500 according to an embodiment of the invention. As can be seen in FIG. 8A, the front view 802 has texture portions 804, 806, 808, 810, 812, and 814, which relate to the visible or unobstructed triangles of the object proxy 600 when view from a front viewing direction.

Figure 8B:
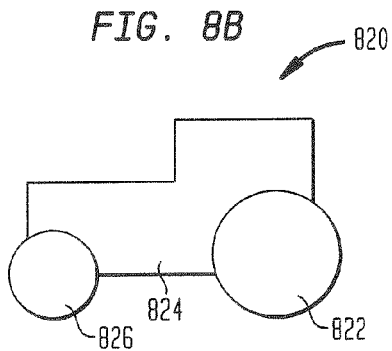
FIG. 8B illustrates an example side view of the object of FIG. 5 according to an embodiment of the invention.

FIG. 8B illustrates an example side view 820 of the object 500 according to an embodiment of the invention. As can be seen in FIG. 8B, the side view 820 has texture portions 822, 824, and 826, which relate to the visible or unobstructed triangles of the object proxy 600 when view from a side viewing direction. None of the texture portions in side view 820 are present in the front view 802.

Figure 8C:
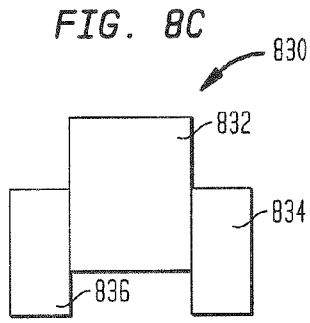
FIG. 8C illustrates an example rear view of the object of FIG. 5 according to an embodiment of the invention.

FIG. 8C illustrates an example rear view 830 of the object 500 according to an embodiment of the invention. As can be seen in FIG. 8C, the rear view 830 has texture portions 832, 834, and 836, which relate to the visible or unobstructed triangles of the object proxy 600 when view from a rear viewing direction. None of the texture portions in either the front view 802 or the side view 820 are present in the rear view 830.

FIG. 8D illustrates an example top view 840 of the object 500 according to an embodiment of the invention. As can be seen in FIG. 8D, the top view 840 has texture portions 842, 844, 846, 848, 850, and 852, which relate to the visible or unobstructed triangles of the object proxy 600 when view from a top viewing direction. Portions of the textures 842, 844, 850, and 852 (which are used to represent tires) are visible in the front view 802 and the rear view 830. The texture 844, for example, contains a portion of the texture 814 that is visible in the front view 802 and a portion of the texture 834 that is visible in the rear view 830. Other texture portions in the top view 840 such as, for example, texture portion 846 are not visible in any of the views 802, 820, or 830.

As explained herein, the four views 802, 820, 830, and 840 (i.e., images of object 500 from different viewing directions) can be rendered using the object 500 and used to form a part of one or more view textures in accordance with the invention. This feature of the invention is further described below with reference to FIG. 10.

Figure 9:
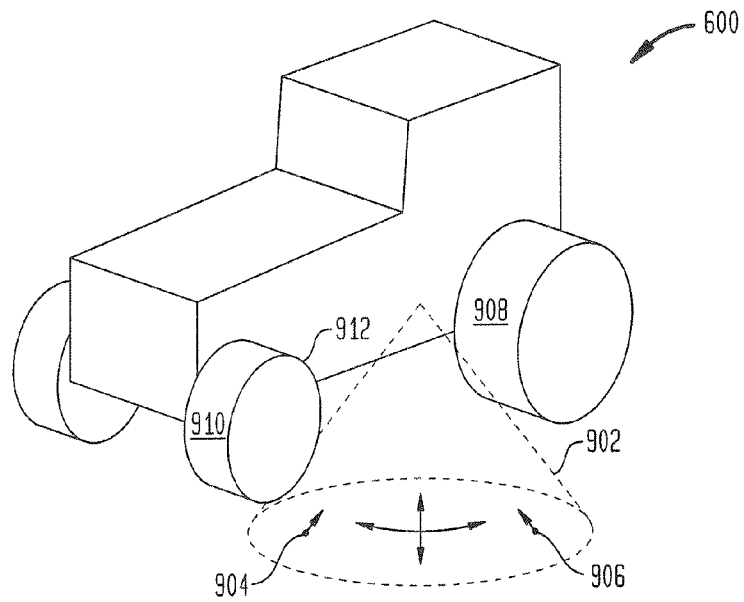
FIG. 9 illustrates how a surface of the object proxy of FIG. 6 can be obstructed from view depending on the viewing direction.

FIG. 9 illustrates how a surface or triangles of the object proxy 600 can be obstructed from a viewer's view depending on the viewing direction. The cone 902 in FIG. 9 represents a series of continuous viewing directions. As can be seen in FIG. 9, at least some of the triangles that form surface 908 are obstructed by the front-facing triangles that form surface 910 and the back-facing triangles that form surface 912, when the surface 908 is viewed from the viewing direction represented by the arrow 904. In contrast, these same triangles that form the surface 908 are not obstructed by the front-facing triangles that form the surface 910 or the back-facing triangles that form the surface 912, when the surface 908 is viewed from the viewing direction represented by the arrow 906.

As illustrated by FIG. 9, obstruction of object proxy triangles occurs when the object proxy is not convex. When an object proxy is not convex, there are viewing directions in which object proxy triangles are either partially or fully obstructed.

In an embodiment, as described above with reference to the steps of method 400, the present invention address the issue of fully or partially obstructed triangles by rendering an object, such as object 500, and setting a clip plane during rendering to a plane of the object proxy containing the fully or partially obstructed triangle being rendered. For back-facing triangles, the appropriate texture is either set to fully transparent or a texture from the closest view in which the back-facing triangle is front-facing is used. These rendering techniques of the invention make it possible to correctly render fully or partially obstructed triangles. As described below, in an embodiment, texture patches are rendered for fully or partially obstructed triangles and made a part of one or more view textures according to the invention.

Figure 10:
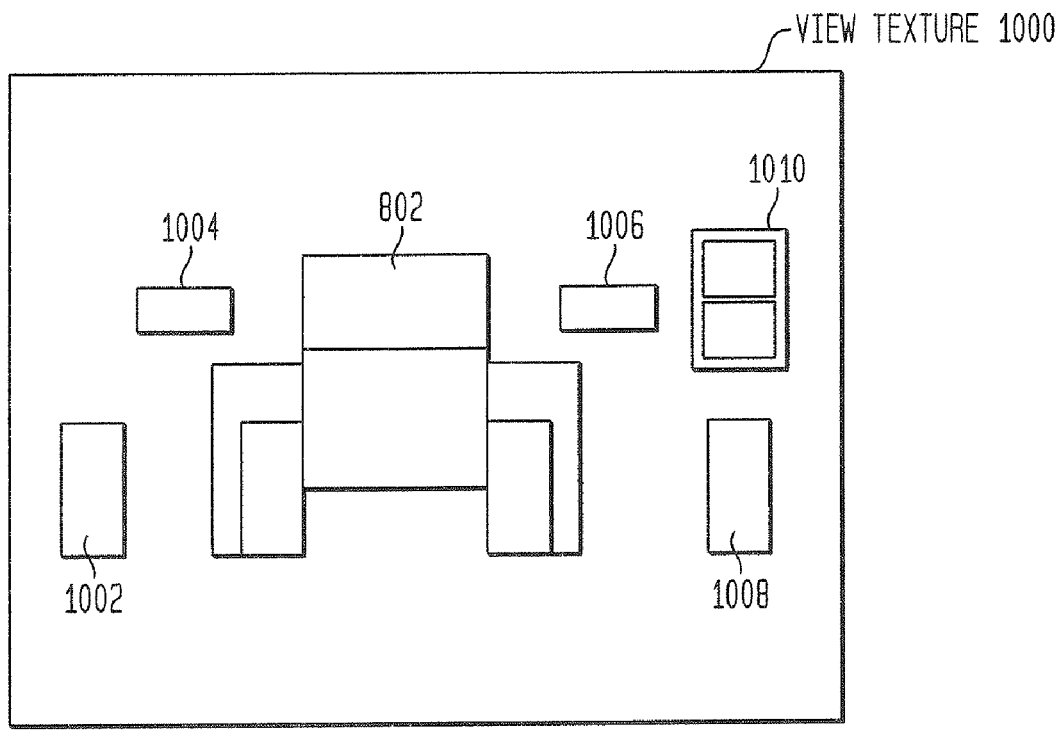
FIG. 10 illustrates an example view texture associated with a front view of the object of FIG. 5 according to an embodiment of the invention.

FIG. 10 illustrates an example view texture 1000 associated with a front view of the object 500 according to an embodiment of the invention. As shown in FIG. 10, the view texture 1000 includes the entire front view (i.e., image) 802 of the object 500 and additional texture patches packed around the view 802. The additional texture patches shown in FIG. 10 include texture patches 1002, 1004, 1006, 1008, and 1010.

The texture patches 1002, 1004, 1006, and 1008 represent texture patches needed to correctly render the fully or partially obstructed triangles of object proxy 600 that form the surfaces of the tires shown in FIG. 9. As can be seen in FIG. 10, the texture patches 1004 and 1006 have been packed around the view 802 using shifts and rotations. The texture patches 1002 and 1008 have been packed around the view 802 using shifts. The texture packing scheme shown in FIG. 10 is only illustrative and not intended to limit the invention. As described herein, any texture packing scheme can be used.

Texture patch 1010 represents a texture patch for a the ladder of object 500. When object 500 is viewed from a front viewing direction, the ladder of object 500 is either partially or fully obstructed. When viewed from a front viewing direction, the triangles of an object proxy forming the surface of the ladder would also be either partially or fully obstructed, as illustrated by FIG. 9. However, as the object proxy is rotated and rendered from other viewing directions, the triangles forming the surface of the ladder become visible. Thus, the texture patch 1010 has been added to the view texture 1000 associated with the front view of object 500 so that view texture 1000 can be used to render the ladder of object 500 when a viewing direction other than that represented by view 802 is desired. Typically, the texture patch 1010 will be blended with a texture patch from a neighboring view texture during render, as described above with regards to method 300.

Figure 11:
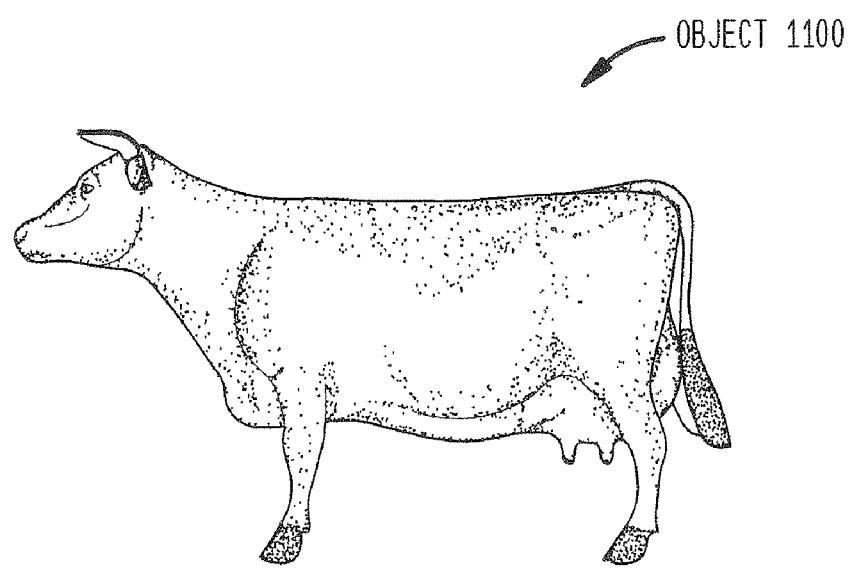
FIG. 11 illustrates a second example object according to an embodiment of the invention.

FIG. 11 illustrates a second example object 1100 according to an embodiment of the invention. Object 1100 is a cow. As can be seen in FIG. 1100, the surfaces of object 1100 (i.e., the cow) are complex. Thus, it is desirable to form one or more object proxies of the cow that can be used to render the cow.

Figure 12:
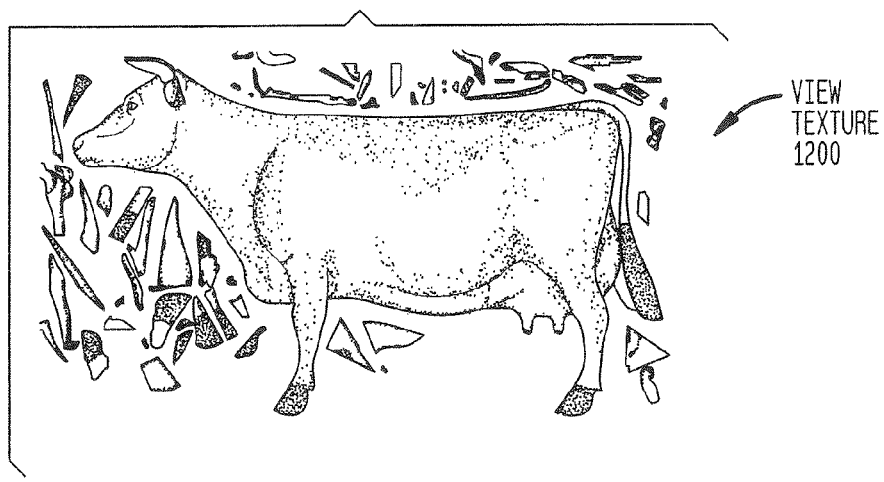
FIG. 12 illustrates an example view texture associated with a side view of the object of FIG. 11 according to an embodiment of the invention.

FIG. 12 illustrates an example view texture 1200 associated with a side view of object 1100 according to an embodiment of the invention. As can be seen in FIG. 12, the view texture 1200 comprises an image of the cow and several texture patches packed around the image of the cow. Texture 1200 further illustrates how view textures of the invention are formed.

Figure 13:
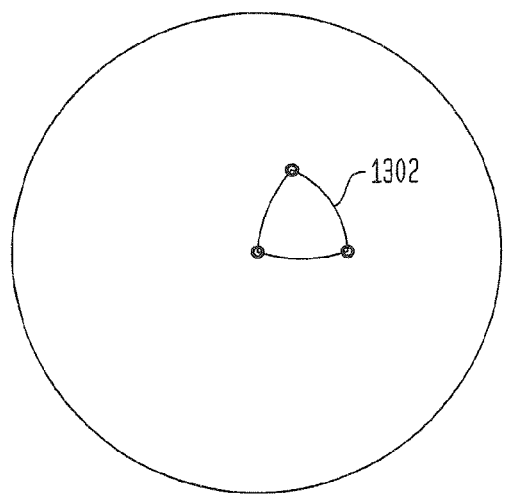
FIG. 13 illustrates an example of how viewing directions can be grouped together according to an embodiment of the invention.

FIG. 13 illustrates an example of how viewing directions can be grouped together according to an embodiment of the invention. FIG. 13 illustrates the formation of spherical triangle groups as described above with respect to method 400. As described above, in embodiments, each spherical triangle such as spherical triangle 1302 defines a group of three views or view textures. The view textures associated with a particular spherical triangle are used to render object proxies associated with the viewing directions encompassed by the spherical triangle.

Figure 14:
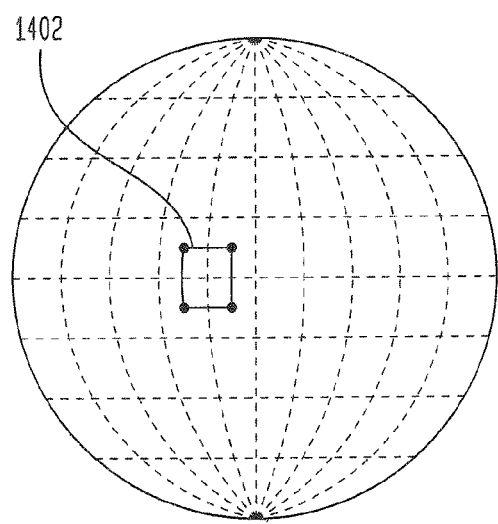
FIG. 14 illustrates a second example of how viewing directions can be grouped together according to an embodiment of the invention.

FIG. 14 illustrates a second example of how viewing directions can be grouped together according to an embodiment of the invention. FIG. 14 illustrates the formation of the ring view groups described above with respect to method 400. As described above, in embodiments, each ring view group such as ring view group 1402 defines a group of four views or view textures. The view textures associated with a particular ring view group are used to render object proxies associated with the viewing directions encompassed by the ring view group.

FIGS. 13 and 14 are only illustrative of view groups than can be formed in accordance with the invention. Other view groups (not shown) are possible.

As described herein, the invention is very flexible, and further features and advantages of the present invention will become apparent to a person skilled in the relevant art given the description of the invention herein.

Further System Embodiments

Figure 15A:
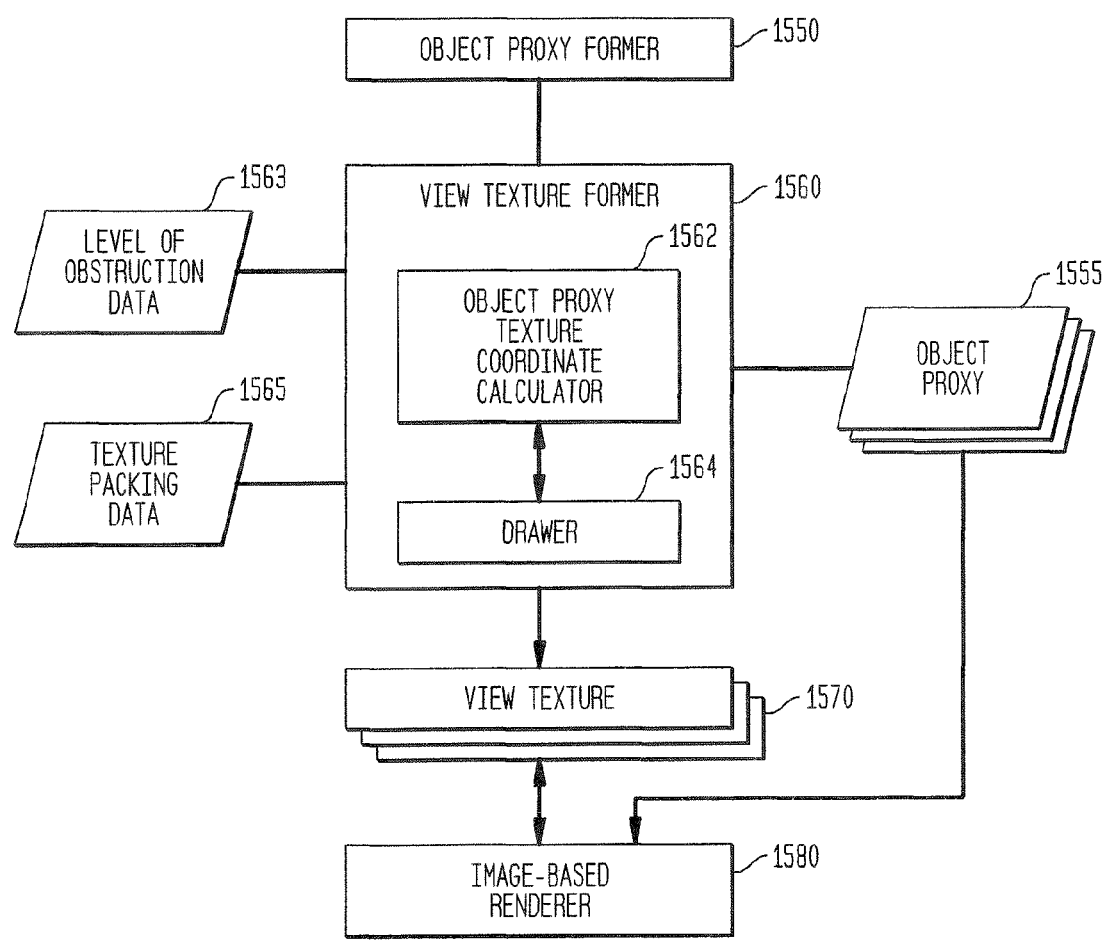
FIG. 15A illustrates a graphics system that includes a view texture former and image-based renderer according to an embodiment of the invention.

FIG. 15A is a diagram of a graphics system 1540 according to an embodiment the present invention. System 1540 includes object proxy former 1550, view texture former 1560, and image-based renderer 1580. Object proxy former 1540 can be any type of object proxy former including, but not limited to, one that generates object proxies based on a general mesh simplification, or an object proxy former as described in the above-referenced co-pending application by Mech incorporated herein by reference in its entirety. View texture former 1560 forms a set of view textures 1570 corresponding to a set of viewing directions. Render 1580 renders one or more object proxies 1555 at a viewing direction with texture applied from view textures selected from the set of view textures 1570.

As shown in FIG. 15A, in one embodiment, view texture former 1560 includes an object proxy texture coordinate calculator 1562 and a drawer 1564. View texture former 1560 determines and stores level of obstruction data 1563 for each polygon in each object proxy 1555. View texture former 1560 also determines and stores texture packing data 1565. Any type of texture packing technique and data can be used with the present invention. In one embodiment, texture packing data 1565 has shift and rotation data relative to a viewing direction which is used in a texture packing algorithm to create texture patches.

In one example, object proxy texture coordinate calculator 1562 calculates texture coordinates for an object proxy based on the level of obstruction at different portions of the object proxy and based on texture packing data. Drawer 1564 draws portions of the object based on the level of obstruction data for the object proxy and based on the texture packing data to obtain a view texture at a respective viewing direction. In one example implementation, drawer 1564 draws the portions of the object that correspond to unobstructed front-facing portions of the object proxy with additional displacement based on corresponding texture packing data, draws the portions of the object that correspond to at least partially obstructed front-facing portions of the object proxy with additional displacement based on corresponding texture packing data and removal of any intervening object portions, and draws the portions of the object that correspond to back-facing portions of the object proxy that are visible from nearby viewing directions with additional displacement based on corresponding texture packing data and removal of intervening object portions, whereby a view texture having texture patches can be obtained.

According to a further embodiment, view texture former 1560 comprises control logic and/or program code for carrying out each of the steps 400-438 described above with respect to FIGS. 4A-4D; and renderer 1580 comprises control logic and/or program code for carrying out each of the steps 300-308 described above with respect to FIG. 3A. In one example, object proxy texture coordinate calculator 1562 comprises control logic and/or program code for carrying out each of the steps 402-420 described above with respect to FIGS. 4A and 4B. Drawer 1564 comprises control logic and/or program code for carrying out each of the steps 422-432 as described above with respect to FIGS. 4C-4D. Either drawer 1564 or view texture former 1560 then can carry out each of the steps 434-438 as described above with respect to FIG. 4D. These are examples only and not intended to limited the present invention. Functionality can be distributed in alternate arrangements between processing components in FIG. 15A as would be apparent to a person skilled in the art given this description.

In addition, the present invention, including each of steps 300-438 described above with respect to FIGS. 3-4, and graphics system 1540 including its components 1560, 1580 described with respect to FIG. 15A, can be implemented in software, firmware, hardware or any combination thereof. Various features of the invention (including each of steps 300-438 described above with respect to FIGS. 3-4, and graphics system 1540 including its components 1560, 1580 described with respect to FIG. 15A) can be implemented in any one of the layers 110-160 of architecture 100, or in any combination of layers 110-160 of architecture 100 as described in FIG. 1. Various features of the invention (each of steps 300-438 described above with respect to FIGS. 3-4, and graphics system 1540 including its components 1560, 1580 described with respect to FIG. 15A) can also be implemented in system 200 as described with respect to FIG. 2 above or in system 1500 as described with respect to FIG. 15B below. These are examples only and not intended to limit the present invention. Functionality can also be distributed in alternate arrangements between processing components as would be apparent to a person skilled in the art given this description.

Figure 15B:
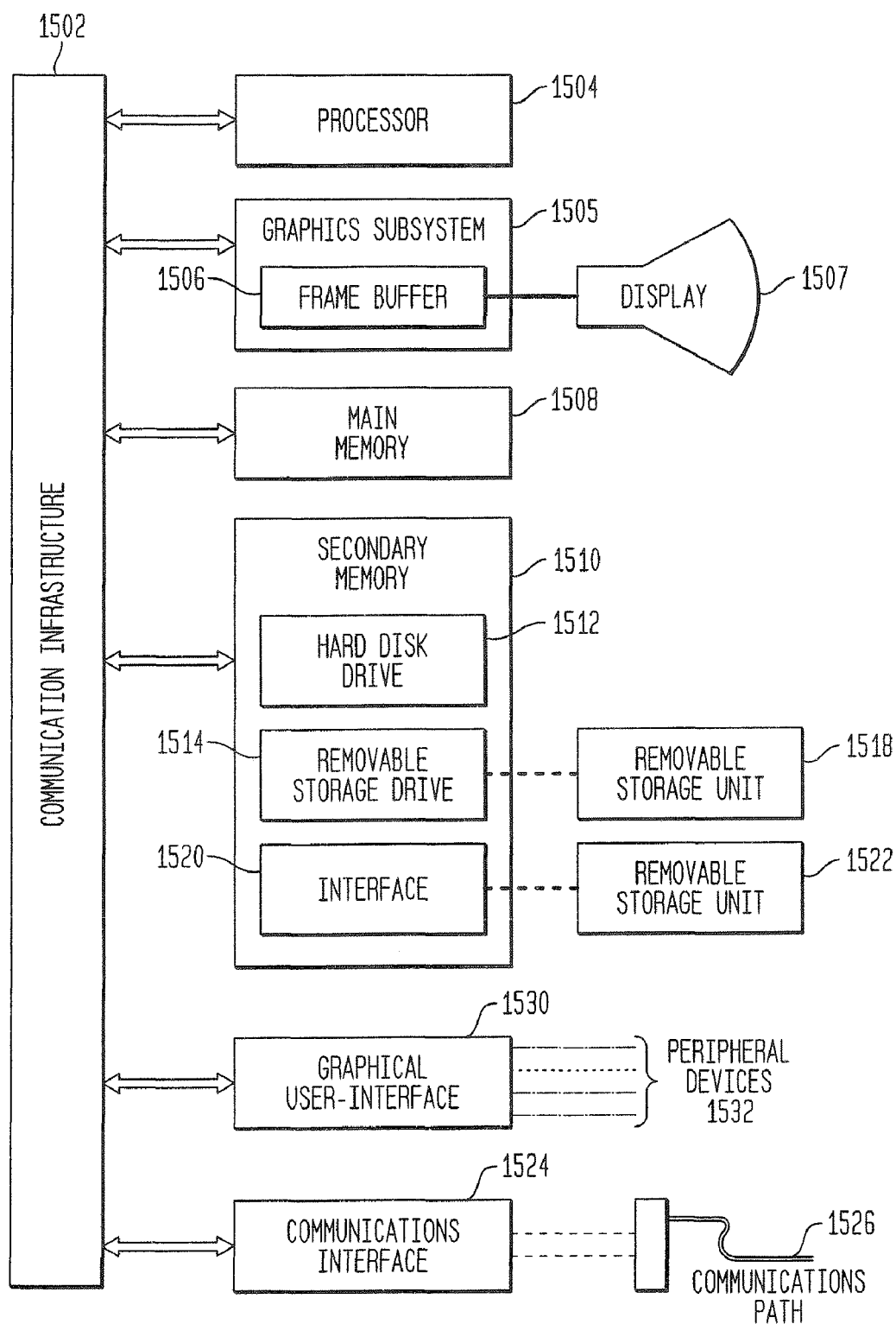
FIG. 15B illustrates an example computer system that can be used to implement embodiments of the invention.

Example Computer System for Implementing Computer Program Product Embodiments of the Invention FIG. 15B illustrates an example of a computer system 1500 that can be used to implement computer program product embodiments of the present invention. This example computer system is illustrative and not intended to limit the present invention. Computer system 1500 represents any single or multi-processor computer. Single-threaded and multi-threaded computers can be used. Unified or distributed memory systems can be used.

Computer system 1500 includes one or more processors, such as processor 1504, and one or more graphics subsystems, such as graphics subsystem 1505. One or more processors 1504 and one or more graphics subsystems 1505 can execute software and implement all or part of the features of the present invention described herein. Graphics subsystem 1505 can be implemented, for example, on a single chip as a part of processor 1504, or it can be implemented on one or more separate chips located on a graphic board. Each processor 1504 is connected to a communication infrastructure 1502 (e.g., a communications bus, cross-bar, or network). After reading this description, it will become apparent to a person skilled in the relevant art how to implement the invention using other computer systems and/or computer architectures.

Computer system 1500 also includes a main memory 1508, preferably random access memory (RAM), and can also include secondary memory 1510. Secondary memory 1510 can include, for example, a hard disk drive 1512 and/or a removable storage drive 1514, representing a floppy disk drive, a magnetic tape drive, an optical disk drive, etc. The removable storage drive 1514 reads from and/or writes to a removable storage unit 1518 in a well-known manner. Removable storage unit 1518 represents a floppy disk, magnetic tape, optical disk, etc., which is read by and written to by removable storage drive 1514. As will be appreciated, the removable storage unit 1518 includes a computer usable storage medium having stored therein computer software and/or data.

In alternative embodiments, secondary memory 1510 may include other similar means for allowing computer programs or other instructions to be loaded into computer system 1500. Such means can include, for example, a removable storage unit 1522 and an interface 1520. Examples can include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

In an embodiment, computer system 1500 includes a frame buffer 1506 and a display 1507. Frame buffer 1506 is in electrical communication with graphics subsystem 1505. Images stored in frame buffer 1506 can be viewed using display 1507. Many of the features of the invention described herein are performed within the graphics subsystem 1505.

Computer system 1500 can also include a communications interface 1524. Communications interface 1524 allows software and data to be transferred between computer system 1500 and external devices via communications path 1526. Examples of communications interface 1524 can include a modem, a network interface (such as Ethernet card), a communications port, etc. Software and data transferred via communications interface 1524 are in the form of signals which can be electronic, electromagnetic, optical or other signals capable of being received by communications interface 1524, via communications path 1526. Note that communications interface 1524 provides a means by which computer system 1500 can interface to a network such as the Internet.

Computer system 1500 can include one or more peripheral devices 1532, which are coupled to communications infrastructure 1502 by graphical user-interface 1530. Example peripheral devices 1532, which can from a part of computer system 1500, include, for example, a keyboard, a pointing device (e.g., a mouse), a joy stick, and a game pad. Other peripheral devices 1532, which can form a part of computer system 1500 will be known to a person skilled in the relevant art given the description herein.

The present invention can be implemented using software running (that is, executing) in an environment similar to that described above with respect to FIG. 7. In this document, the term "computer program product" is used to generally refer to removable storage unit 1518, a hard disk installed in hard disk drive 1512, or a carrier wave or other signal carrying software over a communication path 1526 (wireless link or cable) to communication interface 1524. A computer useable medium can include magnetic media, optical media, or other recordable media, or media that transmits a carrier wave. These computer program products are means for providing software to computer system 1500.

Computer programs (also called computer control logic) are stored in main memory 1508 and/or secondary memory 1510. Computer programs can also be received via communications interface 1524. Such computer programs, when executed, enable the computer system 1500 to perform the features of the present invention as discussed herein. In particular, the computer programs, when executed, enable the processor 1504 to perform the features of the present invention. Accordingly, such computer programs represent controllers of the computer system 1500.

In an embodiment where the invention is implemented using software, the software may be stored in a computer program product and loaded into computer system 1500 using removable storage drive 1514, hard drive 1512, or communications interface 1524. Alternatively, the computer program product may be downloaded to computer system 1500 over communications path 1526. The control logic (software), when executed by the one or more processors 1504, causes the processor(s) 1504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

CONCLUSION

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

Various embodiments of the present invention have been described above, which are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for creating a rendering node, the rendering node being useful for drawing an image in a scene at different levels of detail, comprising:
   (a) forming a first node component having an object and at least one texture, the first node component configured to draw an image of the object at a first level of detail, wherein the first level of detail has a high resolution;
   (b) forming a second node component having an object proxy and a plurality of view textures, the object proxy approximating the geometry of the object, the second node component configured to draw the image of the object at a second level of detail, wherein the second level of detail has an intermediate resolution;
   (c) forming a third node component having a billboard with a plurality of views, the third node component configured to draw the image of the object at a third level of detail, wherein the third level of detail has a low resolution; and
   (d) combining the first node component, the second node component, and the third node component into a level of detail node, wherein, during rendering, one of the first node component, the second node component, and the third node component of the level of detail node is selected based on an input distance and is used to draw the image of the object.

2. The method of claim 1, wherein the plurality of view textures are formed by:
  (i) selecting a particular viewing direction from a set of viewing directions;
  (ii) determining level of obstruction data for each polygon of the object proxy;
  (iii) storing the level of obstruction data;
  (iv) for each polygon, determining whether the polygon is visible from the selected particular viewing direction and whether texture should be applied from a neighboring viewing direction;
  (v) determining texture packing data;
  (vi) storing the texture packing data; and
  (vii) adjusting texture coordinates of each polygon for the selected particular viewing direction based on said determining step (iv) and said texture packing data.

3. The method of claim 1, wherein the first level of detail is selected when the input distance indicates that the image of the object is close to a viewer.

4. The method of claim 1, wherein the third level of detail is selected when the input distance indicates that the image of the object is far from a viewer.

5. The method of claim 1, further comprising blending at least one of between the first level of detail and the second level of detail and between the second level of detail and the third level of detail.

* * * * *